United States Patent [19]
Perlo et al.

[11] Patent Number: 5,884,995
[45] Date of Patent: Mar. 23, 1999

[54] LIGHTING SYSTEM WITH A MICRO-TELESCOPE INTEGRATED IN A TRANSPARENT PLATE

[75] Inventors: Piero Perlo, Sommariva Bosco; Sabino Sinesi, Piossasco, both of Italy

[73] Assignee: C.R.F. Societa Consortile per Azioni, Torino, Italy

[21] Appl. No.: 721,208

[22] Filed: Sep. 26, 1996

[30] Foreign Application Priority Data

Sep. 26, 1995 [IT] Italy .................................. T095A0764

[51] Int. Cl.⁶ ..................................................... F21V 13/04
[52] U.S. Cl. .......................... 362/327; 362/300; 362/307; 362/329; 359/385
[58] Field of Search ...................... 362/244, 245, 362/298–302, 307–309, 327–329, 332–334, 339, 340, 259; 313/512; 359/385, 387, 389, 592, 595, 597, 598, 668, 669, 678, 711

[56] References Cited

U.S. PATENT DOCUMENTS

| 2,642,775 | 6/1953 | Rooney | 359/387 |
| 3,752,560 | 8/1973 | Lunn | 359/387 |
| 4,143,394 | 3/1979 | Schoberl | 313/512 |
| 4,322,135 | 3/1982 | Freeman | 359/711 |
| 4,843,280 | 6/1989 | Lumbard et al. | 313/512 |
| 5,231,536 | 7/1993 | Wilt et al. | 359/385 |

FOREIGN PATENT DOCUMENTS

| 593276 | 2/1978 | Russian Federation | 359/711 |

*Primary Examiner*—Alan Cariaso
*Attorney, Agent, or Firm*—Sughrue, Mion, Zinn, Macpeak & Seas, PLLC

[57] ABSTRACT

The light radiation beam emitted by a source with finite dimension, integrated within a transparent plate, in contact therewith, is initially reflected inside the plate by a first reflecting or semi-reflecting planar surface towards a second planar reflecting surface. Both reflecting surfaces are constituted by portions with an irregular profile provided in the two faces of the transparent plate, without applying a reflective coating.

7 Claims, 3 Drawing Sheets

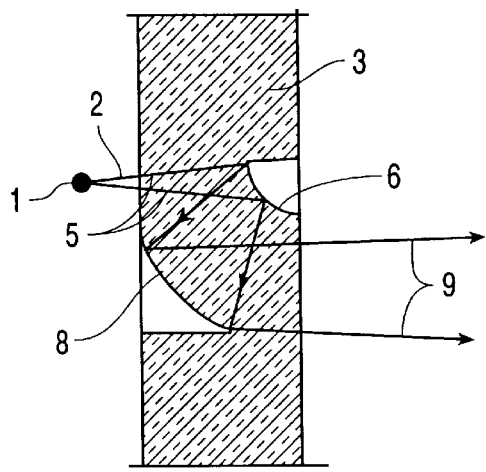
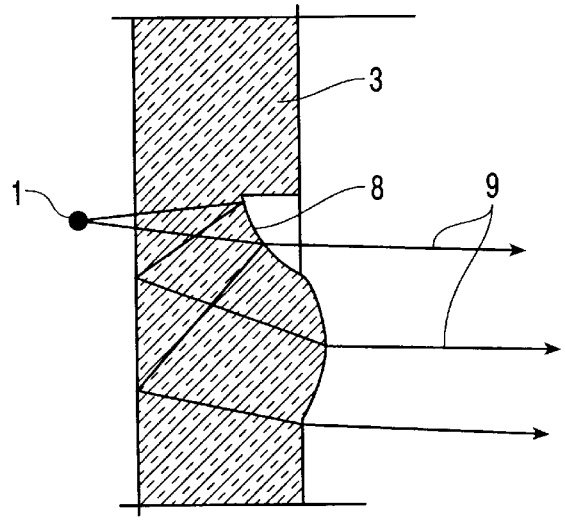
*Fig. 5*  *Fig. 6*
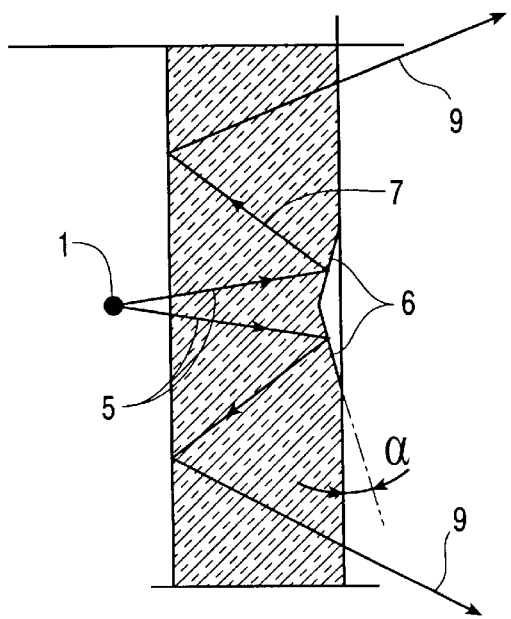
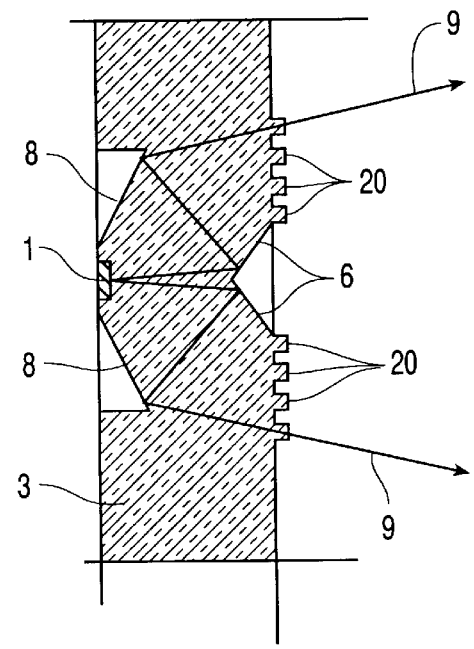
*Fig. 7*  *Fig. 8*

LIGHTING SYSTEM WITH A MICRO-TELESCOPE INTEGRATED IN A TRANSPARENT PLATE

BACKGROUND OF THE INVENTION

The present invention relates to the field of lighting systems, such as outer and inner lighting systems for motor vehicles, lighting systems for buildings, lighting systems for safety signals and road or railway signals, as well as lighting systems for scientific apparatus, laser processes, test or inspection apparatus, measurement systems such as velocimeters, reading or writing systems of the compact disk type, radar sensors for recognizing obstacles or the shape of objects, optical scanning systems, display lighting systems or warning lights.

The correction of vergence of light beams, particularly those emitted by solid state light sources such as LED or lasers, is usually associated with two main requirements: the reduction of the thickness, i.e. the dimension along the optical axis, of the overall optical system and uniformity of the light beam coming out of the system.

In a lighting system, the use of a source or matrix of sources without using lenses is not accepted since it does not satisfy the requirement for uniformity of the light beam through the whole emitting surface. In a conventional system such as that diagrammatically shown in FIG. 1 of the annexed drawings, the divergence of a LED light source 1 is controlled by a lens system 2 aligned on the axis of source 1. Once the diameter of lens 2 is chosen, the thickness of the source-lens system is determined by the divergence of light beam 3 emitted from source 1.

If source 1 emits a very divergent light beam (FIG. 2), the thickness can be partially reduced. However this is achieved to the detriment for the system efficiency. Indeed, in this case beam 3 reaches the first interface of lens 2 at a high incidence angle and therefore is partially reflected backwardly as shown at 4. Moreover, in order that the lens may act efficiently on the beam vergence it is necessary that it has highly curved surfaces. Thus, the lens volume and complexity of manufacture increase.

A further problem associated with this solution is the assembling of the system. It is in fact necessary to provide a casing which keeps source 1 and lens 2 spaced apart from, and aligned with each other. This implies a further increase in the weight and complexity of the system.

SUMMARY OF THE INVENTION

In order to overcome said drawbacks, the present invention provides a micro-telescope lighting system comprising a transparent plate and a light source arranged immediately adjacent to a face of the transparent plate or incorporated within the latter, said plate having a pair of reflective or semi-reflective surfaces on its opposite faces according to a micro-telescope arrangement, so as to generate at the transparent face which is more remote from the light source a light beam going out of the plate, which is expanded, with predetermined shape and features, at least one of said reflective surfaces being obtained without applying a reflecting layer on the respective face of the transparent plate, but simply by forming a portion thereof with an irregular profile.

BRIEF DESCRIPTION OF THE DRAWINGS

The invention will be now described with reference to the annexed drawings, given purely by way of non limiting example, in which:

FIG. 5 shows a further variant of FIG. 3 having an asymmetrical configuration;

FIG. 6 shows a further variant of FIG. 5;

FIG. 7 shows how the reflectivity degree of the device is affected by the first reflecting surface;

FIGS. 8 shows an alternative embodiment with a light source integrated within the plate and refractive or diffractive, or refractive-diffractive hybrid micro-lenses on the front surface of the plate, which are able to shape the light beam;

DETAILED DESCRIPTION OF THE INVENTION

According to the invention, the vergence of the light beam emitted by a source of finite dimension is varied by a micro-telescope optical system integrated within a transparent plate.

Figure 1:
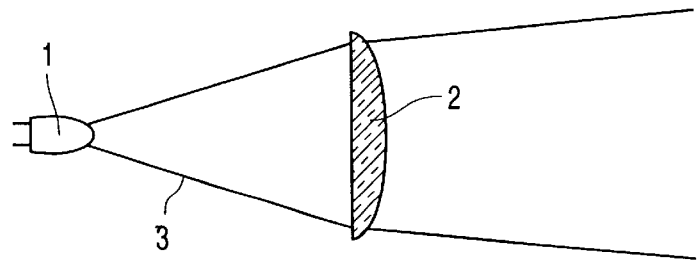
FIG. 1 is a diagrammatic view of a conventional lighting system, including a solid state source of the LED or laser type.
Figure 2:
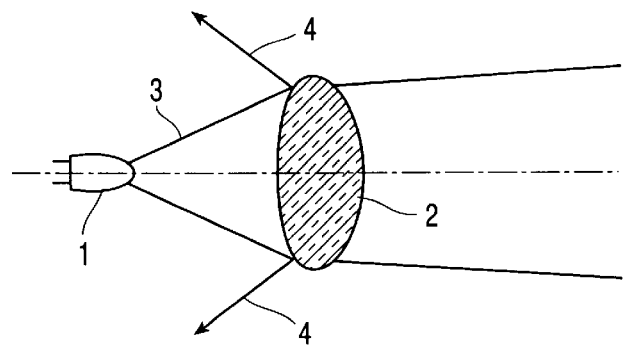
FIG. 2 shows a further known system with a source having a very divergent light beam and a highly curved lens.
Figure 3:
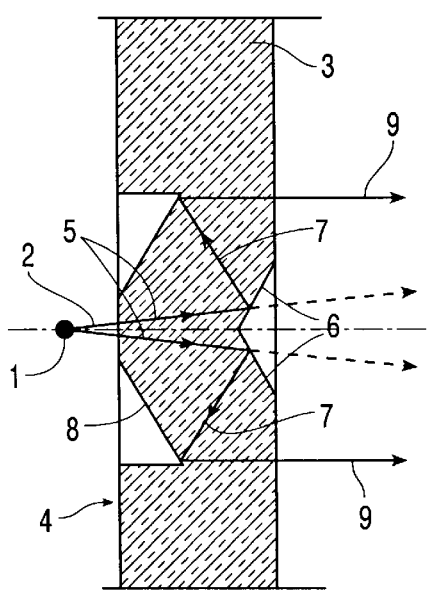
FIG. 3 is a cross-sectional view of a first embodiment of a micro-telescope lighting system according to the invention, including a plate with curved surfaces.

With reference to FIG. 3, a light source 1 emits a beam 2 of light rays whose divergence depends upon the construction of the source itself. The rays are emitted towards a transparent plate 3, constituted of a plastic or glass material, where they reach a first interface 4 on which they are subject to a partial reflection and refraction. The refracted rays 5 reach a first planar surface 6, (located on the face of the plate 3 remote from the source) and obtained by curving of the plate, which reflects the rays towards a second reflecting surface 8 located on the face of plate 3 which is closer to source 1, also formed by curving of the plate, which corrects the vergence of the beam 7 into a pre-established direction. The plate 3 acts as a light guide provided with an integrated micro-telescope. The analytical expression of the two reflecting surfaces 6, 8 is determined as a function of the features of the beam emitted by source 1, the material forming plate 3 and the features which the beam going out of the plate 3 must have. In its more complex configuration, the system is provided with a focal power at its second interface 6, i.e. the light beam is again varied in its distribution and vergence. The reflecting surfaces 6, 8 are obtained, without applying a layer of reflecting material on the surface of plate 3, but simply as a result of the provision of portions with an irregular profile of the plate faces.

Figure 4:
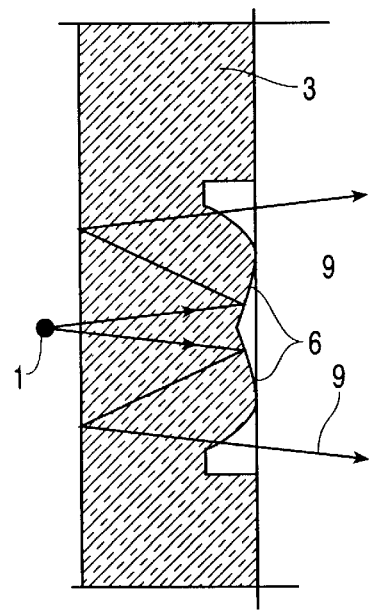
FIG. 4 shows a variant of FIG. 3.

The solution of FIG. 4 has a configuration with curved surfaces located on the same side of plate 3.

FIGS. 5, 6 show solutions similar to those of FIGS. 3, 4 but with an asymmetrical arrangement.

With reference to FIG. 7, the reflectivity coefficient of surface 6 depends upon the refraction index of plate 3, the polarization state of the beam, the wavelength of the radiation and the inclination of surfaces 6. When this inclination becomes greater than the value corresponding to total inner reflection, the whole beam is reflected inside the guide towards the second planar surface 8. Conversely, a portion of the beam is transmitted directly. Thus, a viewer sees the device with no dark areas. The second interface appears as emitting a uniform light beam over the whole surface. On the basis of this principle, it is possible to transform the non polarized state of the beam coming into the guide into a beam with controlled polarization.

In FIG. 8, source 1 is integrated directly in the plate. By providing surfaces 6, 8 with a circular cross-section it would be possible to obtain a beam with a circular cross-section. Conversely, by providing surfaces 6, 8 with a pyramidal configuration or with the configuration of a truncated pyramid, it is possible to obtain a beam with a square or rectangular cross-section. FIG. 8, furthermore, shows the case in which the front surface of plate 3 has diffractive, refractive or diffractive-refractive hybrid projections 20 to shape the light beam, for example in order to obtain two or more light beams along different directions.

Figure 9:
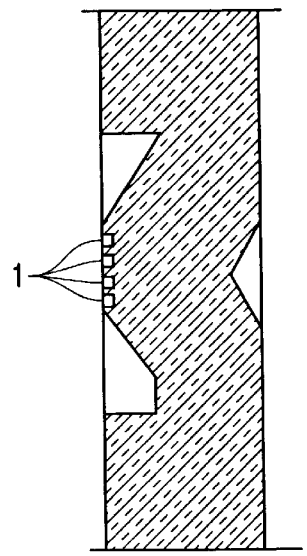
FIG. 9 shows a variant using a polychromatic source constituted by a single source or a number of separate adjacent sources.

In the solution of FIG. 9, the micro-telescope lighting device is used with a polychromatic source beam emitted by a single source or many adjacent separate sources.

Figure 10:
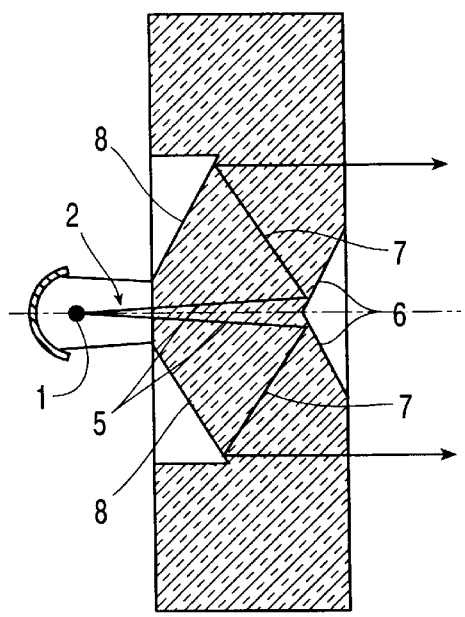
FIG. 10 shows a further variant including a source outside of the plate provided with a mirror which directs part of the beam into the plate.

In FIG. 10, the source is outside of the plate and is provided with a mirror which contributes to direct a part of the radiation towards plate 3. A coating or a refractive surface placed on the first interface 4 may cause a portion of the spectrum to be reflected, the remaining portion being transmitted.

Figure 11:
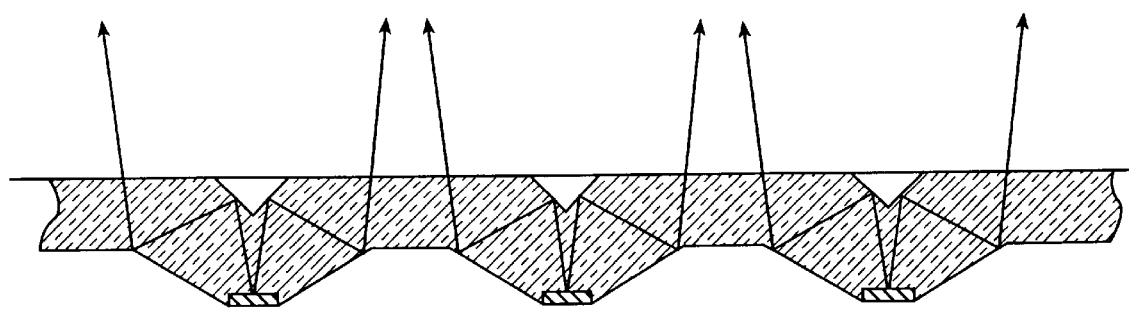
FIG. 11 shows a cross-sectional view of a further embodiment of the invention obtained by providing a matrix of micro-telescope lighting devices.

FIG. 11 shows a cross-section of a matrix of micro-telescope lighting devices, which covers a large surface, such as the surface of a lighting system for a safety signal, or a side or central car light or a lighting device for the passenger compartment of a car, or a device for road signals, for traffic lights, for railway signals, for domestic and industrial building lighting systems, for scientific apparatus, for inspection systems, for laser devices, for measure systems such as velocimeters. The matrix can be constituted by elements different from each other, i.e. in which the beams are generated with different vergence and shape.

Naturally, while the principle of the invention remains the same, the details of construction and the embodiments may widely vary with respect to what has been described and illustrated, without departing from the scope of the present invention.

What is claimed is:

1. Micro-telescope lighting system comprising:
    a transparent plate, and
    a light source arranged in one of immediately adjacent to a face of the transparent plate and incorporated within the plate, said plate having a pair of reflective or semi-reflective surfaces on opposite faces of said plate so as to generate at the face of the transparent plate which is furthest from the light source a light beam going out of the plate, which light beam is expanded, with predetermined shape and features, at least one of said reflective surfaces being obtained without applying a reflecting layer on the respective face of the transparent plate, but simply by forming a portion thereof with an irregular profile, wherein said reflective surface with a greater size has a predetermined geometric cross-section so as to generate a beam having a cross-section similar to said predetermined geometric cross-section.

2. Micro-telescope lighting system according to claim 1, wherein the light source is a solid state source of a light emitting diode or laser type.

3. Micro-telescope lighting system according to claim 1, wherein the transparent plate is constituted of a plastic or glass material and acts as guide for the light beam with a transmittance curve determined as a function of a spectrum emitted by the source.

4. Micro-telescope lighting system according to claim 1, wherein one of the two reflective surfaces has a shape such as to generate a light beam going out of the plate having a square or rectangular cross-section.

5. Micro-telescope lighting system according to claim 1, wherein said profile has a symmetrical arrangement around an optical axis.

6. Micro-telescope lighting system comprising:
    a transparent plate, and
    a light source arranged in one of immediately adjacent to a face of the transparent plate and incorporated within the plate, said plate having a pair of reflective or semi-reflective surfaces on opposite faces of said plate so as to generate at the face of the transparent plate which is furthest from the light source a light beam going out of the plate, which light beam is expanded, with predetermined shape and features, at least one of said reflective surfaces being obtained without applying a reflecting layer on the respective face of the transparent plate, but simply by forming a portion thereof with an irregular profile,
    wherein said surfaces are constituted by pyramidal surfaces or surfaces with a shape of a truncated pyramid, which are curved in the faces of the plate.

7. Micro-telescope lighting system comprising:
    a transparent plate, and
    a light source arranged in one of immediately adjacent to a face of the transparent plate and incorporated within the plate, said plate having a pair of reflective or semi-reflective surfaces on opposite faces of said plate so as to generate at the face of the transparent plate which is furthest from the light source a light beam going out of the plate, which light beam is expanded, with predetermined shape and features, at least one of said reflective surfaces being obtained without applying a reflecting layer on the respective face of the transparent plate, but simply by forming a portion thereof with an irregular profile,
    wherein said profile has an asymmetrical arrangement.

* * * * *